United States Patent
Augustsson et al.

(10) Patent No.: US 9,138,677 B2
(45) Date of Patent: Sep. 22, 2015

(54) AMMONIA STRIPPER FOR A CARBON CAPTURE SYSTEM FOR REDUCTION OF ENERGY CONSUMPTION

(71) Applicant: ALSTOM Technology Ltd, Baden (CH)

(72) Inventors: Ola Augustsson, Vaxjo (SE); Raul Tahoces, Mainz (DE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/950,953

(22) Filed: Jul. 25, 2013

(65) Prior Publication Data

US 2015/0027310 A1     Jan. 29, 2015

(51) Int. Cl.
    *B01D 53/14*      (2006.01)
    *B01D 53/18*      (2006.01)

(52) U.S. Cl.
    CPC ............ *B01D 53/1425* (2013.01); *B01D 53/14* (2013.01); *B01D 53/1475* (2013.01); *B01D 53/18* (2013.01); *B01D 2252/102* (2013.01)

(58) Field of Classification Search
None
See application file for complete search history.

(56) References Cited

U.S. PATENT DOCUMENTS

| | | | |
|---|---|---|---|
| 2010/0021362 A1* | 1/2010 | Hunwick | 423/230 |
| 2012/0063975 A1* | 3/2012 | Koss et al. | 423/220 |
| 2013/0092026 A1 | 4/2013 | Dube | |
| 2013/0189163 A1* | 7/2013 | Koss et al. | 422/169 |

FOREIGN PATENT DOCUMENTS

| | | |
|---|---|---|
| EP | 2 433 700 A1 | 3/2012 |
| WO | 2009/056830 A1 | 5/2009 |
| WO | 2010/020017 A1 | 2/2010 |

OTHER PUBLICATIONS

"Wastewater Technology Fact Sheet—Ammonia Stripping"—US EPA (EPA 832-F-00-019, Sep. 2000).
European Search Report dated Dec. 15, 2014 for EP Appln. No. 14176786.3.

\* cited by examiner

*Primary Examiner* — Duane Smith
*Assistant Examiner* — Cabrena Holecek
(74) *Attorney, Agent, or Firm* — Cynthia W. Flanigan

(57) ABSTRACT

A carbon capture system, such as a chilled ammonia process, is provided that includes with a cooling system, a carbon dioxide absorption system and an ammonia absorption system. The ammonia absorption system includes an absorber column to receive carbon dioxide lean gas stream having ammonia and to receive an absorbent, wherein the absorbent absorbs ammonia from the carbon dioxide lean gas stream to provide an ammonia reduced gas stream and an ammonia rich absorbent. Further, an ammonia stripper is provided to receive the ammonia rich absorbent and to receive a portion of the gas stream, wherein the gas stream flows through the ammonia stripper to heat the ammonia rich absorbent to release the ammonia therefrom and provide an ammonia rich gas stream and an ammonia reduced absorbent.

12 Claims, 3 Drawing Sheets

US 9,138,677 B2

AMMONIA STRIPPER FOR A CARBON CAPTURE SYSTEM FOR REDUCTION OF ENERGY CONSUMPTION

TECHNICAL FIELD

The present disclosure generally relates to reducing energy consumption of a carbon capture process and system, such as a chilled ammonia process (CAP) and system for carbon dioxide ($CO_2$) removal from a gas stream and, more specifically, relates to a CAP $CO_2$ removal process and system using a waste heat in a flue gas to strip ammonia for the reduction of energy consumption.

BACKGROUND

Energy used in the world can be derived from the combustion of carbon and hydrogen-containing fuels such as coal, oil, peat, waste and natural gas. In addition to carbon and hydrogen, these fuels contain oxygen, moisture and contaminants. The combustion of such fuels results in the production of a gas stream containing the contaminants in the form of ash, carbon dioxide ($CO_2$), sulfur compounds (often in the form of sulfur oxides, referred to as "SOx"), nitrogen compounds (often in the form of nitrogen oxides, referred to as "NOx"), chlorine, mercury, and other trace elements. Awareness regarding the damaging effects of the contaminants released during combustion triggers the enforcement of even more stringent limits on emissions from power plants, refineries and other industrial processes. There is an increased pressure on operators of such plants to achieve near zero emission of contaminants. However, removal of contaminants from the gas stream, such as a flue gas stream, requires a significant amount of energy.

Moreover in CAP processing the CAP stripper functions to separate a water/ammonia/$CO_2$ solution absorbed in the water wash column. The ammonia is returned to the $CO_2$ absorber for capture of $CO_2$, and water is returned to the water wash column for ammonia capture. To strip ammonia from the ammonia rich water wash solution, steam is provide to a heat exchanger or reboiler to heat the fluid flowing through the ammonia stripper. As known, a reduction in the use of steam for such a system with no penalty is advantageous to the efficiency of the system.

Accordingly, there exists a need for the reduction of the use of steam in such systems and processes for recovering ammonia and carbon dioxide from a flue gas stream in carbon capture system, particularly in CAP applications.

SUMMARY

According to aspects illustrated herein, there is provided an ammonia absorption system of a carbon capture system for removing carbon dioxide from a gas stream. The ammonia absorption system includes an absorber column to receive carbon dioxide lean gas stream having ammonia and to receive an absorbent. The absorbent absorbs ammonia from the carbon dioxide lean gas stream to provide an ammonia reduced gas stream and an ammonia rich absorbent. An ammonia stripper receives the ammonia rich absorbent and a portion of the gas stream. The gas stream flows through the ammonia stripper to heat the ammonia rich absorbent to release the ammonia therefrom and provide an ammonia rich gas stream and an ammonia reduced absorbent.

According to another aspect illustrated herein, there is provided a method of stripping ammonia from an ammonia rich absorbent of a carbon capture system for removing carbon dioxide from a gas stream. The method includes contacting a carbon dioxide lean gas stream having ammonia and an absorbent, wherein the absorbent absorbs ammonia from the carbon dioxide lean gas stream to provide an ammonia reduced gas stream and an ammonia rich absorbent. The method further includes contacting the ammonia rich absorbent and a portion of the gas stream, wherein the gas stream heats the ammonia rich absorbent to release the ammonia therefrom and provide an ammonia rich gas stream and an ammonia reduced absorbent.

The above described and other features are exemplified by the following figures and in the detailed description.

BRIEF DESCRIPTION OF THE DRAWINGS

Referring now to the figures, which are exemplary embodiments, and wherein the like elements are numbered alike.

DETAILED DESCRIPTION

Figure 1:
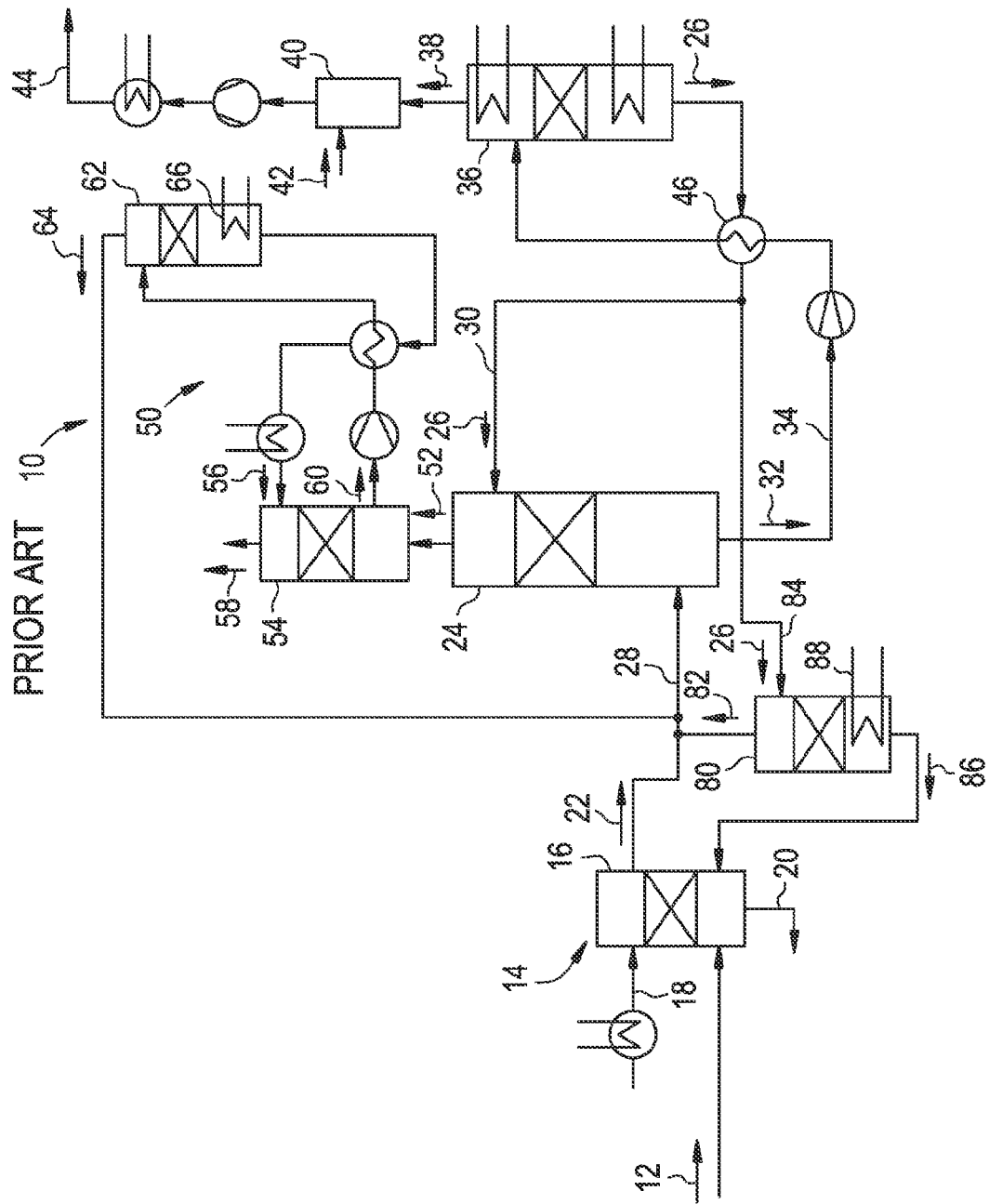
FIG. 1 is a schematic diagram (Prior Art) generally depicting an ammonia based $CO_2$ removal system.

FIG. 1 is a schematic representation of an example of a known CO2 capture system 10 for removing CO2 from a flue gas stream 12 generated by the combustion of a fuel in a furnace (not shown). The CO2 capture system 10 absorbs carbon dioxide from the flue gas stream 12 which is cooled by a cooling system 14. Before introduction to the cooling system 14, the flue gas stream 12 may undergo treatment to remove contaminants therefrom upstream of the cooling system, such as, for example a flue gas desulfurization process and particulate collector (not shown).

The cooling system 14 may be any system that can produce cooled flue gas stream 12 and may include, as shown in FIG. 1, a direct contact cooler (DCC) 16 that receives cooled water at input line 18 to wash and/or scrub the flue gas stream, capture contaminants, and/or lower the moisture content of the flue gas stream. The water solution exiting the DCC 16 is recycled and/or removed from the cooling system 14 via line 20.

The $CO_2$ capture system 10 further comprises a $CO_2$ absorber 24 arranged to allow contact between the cooled flue gas stream 22 and an absorption solution 26, comprising ammonia ($NH_3$), such as an ammonia water solution lean in $CO_2$. Thus, the flue gas stream 22 from which $CO_2$ is to be removed is fed to the $CO_2$ absorber 24 via line 28. The CO2 lean ammonia water solution 26 is fed to the $CO_2$ absorber 24 via line 30. The $CO_2$ lean ammonia water solution 26 flows downward in countercurrent direction to the flue gas stream 22 passing upward through the absorber 24. In the $CO_2$ absorber 24, $CO_2$ from the flue gas stream 22 is absorbed in the $CO_2$ lean ammonia solution 26, for example, by formation of carbonate or bicarbonate of ammonium.

After the CO2 is absorbed within the CO2 absorber 24, the absorption solution 32 containing absorbed $CO_2$ (for example, a $CO_2$ rich ammonia solution) exits the $CO_2$ absorber 24 via line 34. The $CO_2$ rich absorption solution 32 is preheated and pumped to an absorption solution regenerator 36. The $CO_2$ rich absorption solution 32 flowing downward through the regenerator 36 is heated to separate and release the $CO_2$ from the $CO_2$ rich absorption solution to form a $CO_2$ rich gas stream 38 and the $CO_2$ lean absorption solution 26. The separated $CO_2$ gas stream 38 exits the absorption solution regenerator 36 to a $CO_2$ purifier 40 which separates or washes residual ammonia from the $CO_2$ gas stream using water or aqueous solution 42. The purified $CO_2$ gas stream exiting the purifier 40 is compressed and cooled before exiting via line 44 for storage.

The CO2 lean absorption solution 26 exiting the regenerator 36 is recycled to the CO2 absorber 24 via line 30. Heat exchanger 46 cools the $CO_2$ lean absorption solution 26 and heats the $CO_2$-rich absorption solution 32 provided to the regenerator 36.

As further shown in FIG. 1, the $CO_2$ capture system 10 also includes an ammonia absorption system 50 for removing ammonia present in the $CO_2$ lean flue gas stream 52 exiting the $CO_2$ absorber 24. The ammonia absorption system 50 includes an ammonia absorber 54, or water wash column. The ammonia absorber 54 is arranged to allow contact between the $CO_2$ lean flue gas stream 52 which leaves the $CO_2$ absorber 24 and a second absorption solution 56, which contains no ammonia or a low concentration of ammonia. The second absorption solution 56 may be primarily water. In the ammonia absorber 54, contaminants, including ammonia, remaining in the gas stream when it leaves the $CO_2$ absorber 24 are absorbed in the water solution 56 as the water solution flows downward in a countercurrent direction with the $CO_2$ lean flue gas stream 52 passing upward. The ammonia absorber 54 provides a cleaned flue gas 58 depleted of $CO_2$ and reduced ammonia levels for dispersal to the atmosphere and a water solution 60 having ammonia, $CO_2$ and other contaminants. The ammonia rich water solution 60 is pumped and preheated before entering an ammonia stripper 62 for release and separating ammonia from the ammonia rich water solution 60. The ammonia stripper 62, in which the ammonia rich water solution 60 is heated to a temperature at which lower boiling point components may be transferred to the gas phase to form the stripper offgas stream 64, while higher boiling point components remain in the liquid phase and may be cooled and recycled back to the ammonia absorber 54 for use as the water solution 56. The offgas stream 64 has at least ammonia exiting therefrom. The water solution 56 is an aqueous solution being ammonia lean or free. The stripper 62 may be heated using high, medium or low pressure steam depending on the stripper operating pressure passing through a heat exchanger 66 or a reboiler (not shown).

The off stream gas 64 of the stripper 62, generally comprising ammonia, $CO_2$ and other low boiling point contaminants, could be fed to the $CO_2$ absorber 24 via line 28, as shown in FIG. 1.

An appendix stripper 80 is further provided to strip ammonia from a $CO_2$ lean ammonia solution 26 resulting in an ammonia rich gas 82, which is provided to the input line 28 of the $CO_2$ absorber 24. The $CO_2$ lean ammonia solution 26 exits the lower portion of the regenerator 36 and is provided to an upper portion of the appendix stripper column 80 via line 84. The appendix stripper may generally be a stripper column, in which the CO2 lean ammonia solution 24 is heated to a temperature at which lower boiling point components may be transferred to the gas phase to form an ammonia rich gas stream 82, while higher boiling point components remain in the liquid phase, namely, ammonia lean or free water stream 86 and may be provided to the DCC 16. The stripper 80 may be heated using high, medium or low pressure steam depending on the stripper operating pressure passing through a heat exchanger 88 or a reboiler (not shown).

In contrast to known chilled ammonia process (CAP) systems and processes similar to that shown in FIG. 1, and as further described below with respect to FIGS. 2 and 3, the embodiments of the present invention disclosed herein employ the use of waste heat in a gas stream, such as flue gas, during the ammonia stripping process to replace the use of steam as a means to heat an ammonia stripper. Specifically, the present invention uses a portion of the saturated warm flue-gas to strip the water from the ammonia and to replace the energy provided by steam for the ammonia stripping process. The present invention reduces steam consumption by 15-25%. Accordingly, the present invention replaces, e.g., the steam cycle 66 shown in stripper 62 of FIG. 1, and thereby reduces the energy consumption of the overall system. Consequently, the present invention provides a strong decrease in steam demand for a low pressure (LP) turbine, for example, of the power plant. A further advantage is the reduction of thermal equipment, such as reboilers, condensers, and heat exchanger surface, as well as cooling of the stripper outlet flow.

Figure 2:
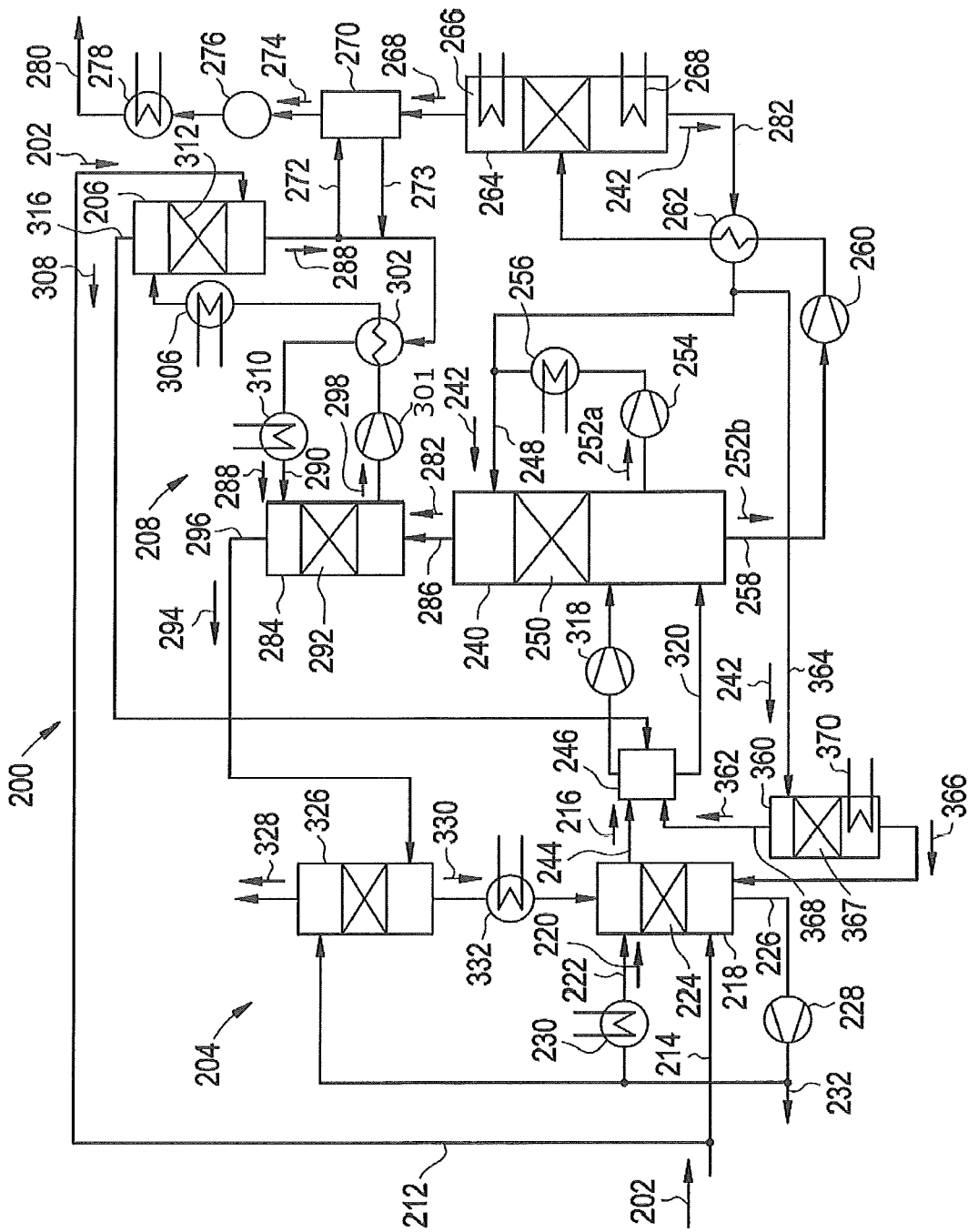
FIG. 2 is schematic diagram depicting an ammonia based $CO_2$ removal system including a ammonia stripper, according to an embodiment of the present invention.

In FIG. 2 as will be described in greater detail below, according to embodiments, the present invention uses a portion of the flue gas 202 via line 212 to strip the water from the ammonia. Furthermore, the portion of flue gas 202 replaces the energy provided by a steam source for stripping ammonia from an ammonia rich water stream 298 with heat provided by a portion of the saturated warm flue gas stream 214 provided to the carbon capture system 200 for treatment. Specifically, a portion of the warm flue gas stream passes through the ammonia stripper 206 to provide heat necessary to strip ammonia from the water stream 298 generated by the wash water system 208. Consequently, the energy provided by the flue gas 202 replaces at least a portion of the thermal energy provided by steam supplied to a heat exchanger 66 or reboiler of the ammonia stripper 62 of FIG. 1, as well as strips water from the ammonia rich water stream 298.

As shown in FIG. 2, the $CO_2$ capture system 200 receives a treated flue gas stream 202 generated by the combustion of a fuel in a furnace (not shown). The $CO_2$ capture system 200 absorbs carbon dioxide from the treated flue gas stream 202 which is cooled by a cooling system 204. The temperature of the warm flue gas is approximately 65 degrees Celsius, which may be in the range of approximately 60-70 degrees Celsius. Before introduction to the cooling system 204, the flue gas stream from the furnace may undergo treatment to remove contaminants therefrom upstream of the cooling system, such as, for example a flue gas desulfurization process and particulate collector (not shown). The low $SO_x$ content of this treated flue gas 202 helps to prevent corrosion of the ammonia stripper 206 and other components of the water wash system 208, and to avoid accumulation of contaminants. The percentage of $SO_x$ content in the flue gas is preferably below 10 ppm and more preferably below 1 ppm.

A portion of the treated flue gas 202 is provided to lower portion of the ammonia stripper 206 via line 212 to strip the water from the ammonia solution 298 and provide an energy source to release ammonia from the ammonia solution. The percentage of flue gas 202 provided to the stripper 206 is approximately 10%, however the present invention contemplates that this amount of flue gas may be in the range of 5%-25% of the flue gas stream 202. The remaining portion of the flue gas stream 202 is provided via line 214 to the cooling system 204 of the $CO_2$ capture system 200.

The cooling system 204 may be any system that can produce a cooled flue gas stream 216 and may include a direct contact cooler (DCC) 218 that wash and/or scrub the flue gas stream, capture contaminants, and/or lower the moisture content of the flue gas stream. A cooling fluid 220, such as water or other aqueous solutions, is provided at an upper portion of the DCC 218 at line 222. The cooling fluid 220 flows downward in countercurrent direction to the flue gas stream 214 passing upward through the DCC 218. The DCC includes a mass transfer device (MTD) 224 for increasing the contact and resident time of the flue gas 214 and water 220 to facilitate the cooling of the flue gas stream. The mass transfer device 224 may include packing, such as structural packing, random packing and/or hydrophilic packing. At the lower portion of the DCC 218, a portion of the wash or water 220 exiting the DCC 218 at line 226 is circulated back to the upper portion of the DCC through a pump 228 and which may be cooled by a heat exchanger 230. The other portion of the wash is removed from the DCC 218 via line 232.

The cooled flue gas 216 exiting the DCC 218 may have a temperature that is lower than the ambient temperature. In one example, cooled flue gas stream may have a temperature between about zero degrees Celsius and about twenty degrees Celsius. In another embodiment, the cooled flue gas stream may have a temperature between about zero degrees Celsius and about ten degrees Celsius.

The $CO_2$ capture system 200 further comprises a $CO_2$ absorber 240 arranged to allow contact between the cooled flue gas stream 216 and a chilled absorption solution 242 comprising ammonia ($NH_3$). Thus, the flue gas stream 216 from which $CO_2$ is to be removed is fed to the $CO_2$ absorber 240 via line 244 via a suction drum 246, which will be described in greater detail hereinafter. In the $CO_2$ absorber 240, this cooled flue gas stream 216 is contacted with the absorption solution 242, by bubbling the gas stream through the absorption solution or by spraying the absorption solution into the gas stream with the absorber.

As shown in FIG. 2, the chilled absorption solution 242 is fed to the $CO_2$ absorber 240 via line 248. The absorption solution flows downward in countercurrent direction to the flue gas stream 216 passing upward through the absorber 240. The $CO_2$ absorber 240 includes a mass transfer device (MTD) 250 for increasing the contact and resident time of the flue gas 216 and absorption solution 242 to facilitate the absorption of $CO_2$ in the flue gas stream by the ammonia. The mass transfer device 250 may include packing, such as structural packing, random packing and/or hydrophilic packing. In the $CO_2$ absorber 240, $CO_2$ from the flue gas stream 216 is absorbed in the absorption solution 242, for example, by formation of carbonate or bicarbonate of ammonium, either in dissolved or solid form.

A portion of used $CO_2$ rich absorption solution 252a containing absorbed $CO_2$ is recycled back to the upper portion of the absorber 240 through a pump 254. The recycled absorption solution 252a is further cooled by a heat exchanger 256. The other portion of the $CO_2$ rich absorption solution 252b exits the $CO_2$ absorber 240 via line 258. The $CO_2$ rich absorption solution 252b is pumped via pump 260 and heated by heat exchanger 262 before entering a regenerator 264. The regenerator 264 is heated by one or more heat exchangers 266, 268 to separate and release the $CO_2$ from the $CO_2$ rich absorption solution 252b to form a $CO_2$ rich gas stream 268 and a regenerated absorption solution ($CO_2$ lean absorption solution) 242. Alternatively, the regenerator 264 may be heated by a reboiler (not shown). The heat exchangers and reboiler may be heated by steam such as provided by a low pressure (LP) turbine (not shown). The separated $CO_2$ gas stream 268 exits the regenerator 264 to a $CO_2$ purifier 270 which absorbs residual ammonia from the $CO_2$ gas stream using water or other aqueous solution. Such water may be provided from the ammonia stripper 206 via line 272 and recycled back via line 273. The purified $CO_2$ gas stream 274 is compressed by a compressor 276 and cooled by one or more heat exchangers 278 before exiting via line 280 for further use or sequestration.

The regenerated absorption solution 242 is recycled to the $CO_2$ absorber 240 via line 282. Heat exchanger 262 cools the regenerated absorption solution 242 and heats the $CO_2$ rich absorption solution 252b provided to the regenerator 264.

As further shown in FIG. 2, the $CO_2$ capture system 200 also includes a water wash system 208 for removing ammonia present in the $CO_2$ lean flue gas stream 282 exiting the $CO_2$ absorber 240. The water wash system 208 includes an ammonia absorber 284, such as a water wash column. The water wash column 284 is arranged to allow contact between the $CO_2$ lean flue gas stream 282 which leaves the $CO_2$ absorber 240 via line 286 and a second absorption solution 288, such as a water stream, which contains no ammonia or a low concentration of ammonia. The second absorption solution 288 may be primarily water or other aqueous solution. The water stream 288 is fed to the water wash column 284 via line 290. In the water wash column 284, contaminants, including ammonia, remaining in the gas stream when it leaves the $CO_2$ absorber 240 are absorbed in the water stream 288. The water stream 288 flows in a countercurrent direction with the $CO_2$ lean flue gas stream 282 passing upward through the water wash column 284. The column 284 includes a mass transfer device (MTD) 292 for increasing the contact and the resident time of the flue gas 282 and the water stream 288 in the water wash column 284 to facilitate the absorption or wash of ammonia and other contaminants in the flue gas stream by the water stream. The mass transfer device 292 may include packing, such as structural packing, random packing and/or hydrophilic packing. The water wash column 284 provides a cleaned flue gas 294 depleted of $CO_2$ and reduced ammonia levels exiting via an exit line 296 and an ammonia rich water stream 298 having ammonia, $CO_2$ and other contaminants.

The ammonia rich water stream 298 containing absorbed ammonia is pumped via a pump 301 and heated by heat exchanger 302 before entering a regenerator or ammonia stripper 206 for releasing and separating ammonia from ammonia rich water stream 298. A second heat exchanger 306 to heat the ammonia rich water stream 298 may be necessary to ensure the temperature of the ammonia rich water stream is at least 70 degrees Celsius when entering the stripper 206. The temperature of ammonia rich water stream 298 is preferably in the range of at least 60-75 degrees Celsius. The second heat exchanger 306 may be heated by steam. In the ammonia stripper 206, the ammonia rich water stream 298 is heated to a temperature at which lower boiling point components may be transferred to the gas phase to form the stripper offgas stream 308, while higher boiling point components mainly remain in the liquid phase 288 and may be recycled back to the ammonia absorber 284 for use as the second absorption solution. This liquid phase may be an ammonia lean or free water stream 288, which is cooled by one or more heat exchangers 302, 310. The water stream 288 flows downward through a mass transfer device (MTD) 312 for increasing the resident time of the portion of flue gas 202 and the ammonia rich water stream 298 to facilitate the release or stripping of ammonia, $CO_2$ and other contaminants to an exit line 316. The mass transfer device 312 may include packing, such as structural packing, random packing and/or hydrophilic packing.

Advantageously, the stripper 206 is heated to a temperature in the range of 60-70 degrees Celsius using the portion of the saturated warm flue gas 202 provided via line 212. The portion of the saturated warm flue gas 202, which may be cleaned of SOx, but not necessary, is provided to a lower portion of the stripper 206 below the MTD 312. The flue gas 202 flows upward in a countercurrent direction of the downward flow of the ammonia rich water stream 298. The flue gas 202 provides heat used to release the ammonia (and $CO2$) in gas phase from the ammonia rich water stream 298.

The flue gas also provides a means for stripping the ammonia from the water stream 298. The ammonia rich offgas 308 is provided to the suction drum 246. A booster fan 318 in fluid communication with the suction drum and $CO_2$ absorber 240 draws both the ammonia gas stream 308 and the cooled flue gas stream 216 into the suction drum 246 and to the lower portion of the absorber 240. A liquid phase settled in the suction drum is provided to the absorber 240 via line 320. As described hereinbefore, the heat of the flue gas stream 202 provided to the stripper 206 enables the elimination of the heat exchanger or reboiler 66 of FIG. 1.

An appendix stripper 360 is further provided to strip ammonia from the $CO_2$ lean ammonia solution 242 resulting in an ammonia rich gas 362, which is provided to the $CO_2$ absorber 240 via the suction drum 246. The $CO_2$ lean ammonia solution 242 exits from the regenerator 264 and is provided to an upper portion of the appendix stripper column 360 via line 364. The appendix stripper 360 may generally be a stripper column, in which the $CO_2$ lean ammonia solution 242 is heated to a temperature at which lower boiling point components may be transferred to the gas phase to form an ammonia rich gas stream 362, while higher boiling point components remain in the liquid phase, namely, ammonia lean or free water stream 366 and may be provided to the DCC 218. Within the appendix stripper 360, the ammonia rich absorbent 242 flows downward through a mass transfer device (MTD). The mass transfer device 367 may include packing, such as structural packing, random packing and/or hydrophilic packing. The MTD functions to increase the resident time of the CO2 lean ammonia solution 242 to facilitate the release or stripping of ammonia to line 368. The appendix stripper 360 may be heated using high, medium or low pressure steam depending on the stripper operating pressure passing through a heat exchanger 370 or a reboiler (not shown).

The CO2 capture system 200 further includes a direct contact heater (DCH) 326 for heating the clean flue gas 294 exiting the water wash column 284. The DCH 326 receives a portion of the water stream from line 226 of the DCC 218 and the cleaned flue gas 294 from the water wash column 284. The water stream is received at an upper portion of the DCH 326 and the cleaned flue gas is received at a lower portion of the DCH. A mass transfer device is disposed in the DCH 326. The water stream and the cleaned flue gas 294 flow in a countercurrent direction whereby the cleaned flue gas is heated while the water stream is cooled. The heated flue gas 328 is provided to the atmosphere via a stack (not shown) and the cooled water stream 330 is recycled back to the DCC 218. The cooled water stream 330 may be further cooled by a heat exchanger 332.

Figure 3:
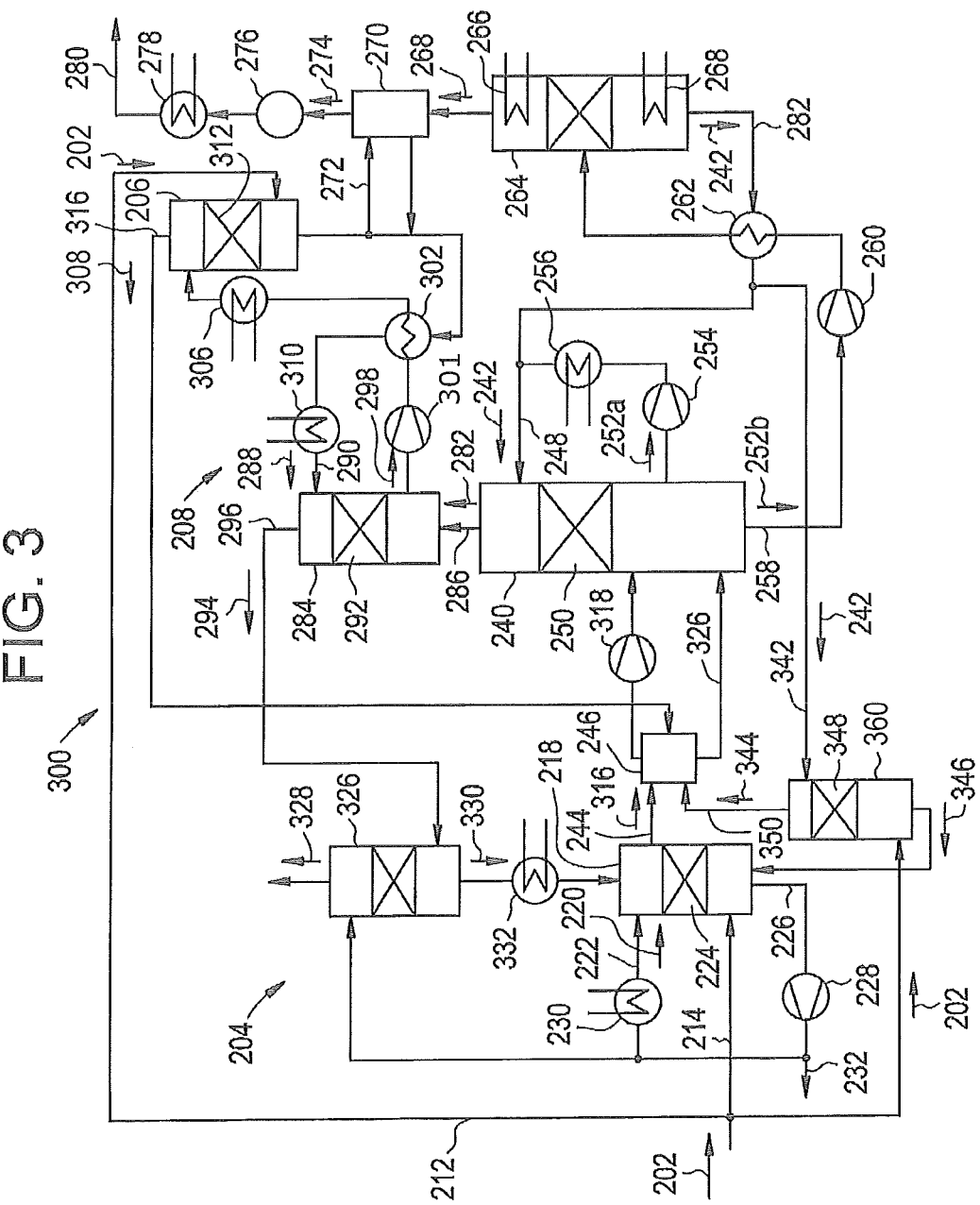
FIG. 3 is schematic diagram depicting another embodiment of the $CO_2$ removal system disclosed herein including a flue gas stripper and an appendix ammonia stripper, according to another embodiment of the present invention.

Referring to FIG. 3, a $CO_2$ capture system 300 is provided that is similar to the $CO_2$ capture system 200 of FIG. 2, wherein the system further comprises an appendix stripper 360 for stripping ammonia from the $CO_2$ lean ammonia solution 242, embodying the present invention. Components of the system 300 of FIG. 3 that have the same reference number as the components of the system 200 of FIG. 2 are the same or similar and function in the same or similar manner.

As shown in FIG. 3, the appendix stripper 360 receives a portion of the $CO_2$ lean ammonia solution 242, which is rich in ammonia and deplete of $CO_2$, exiting from the regenerator 264. The $CO_2$ lean ammonia solution 242 is provided to an upper portion of the appendix stripper 360 via line 342. Another portion of the treated flue gas stream 202 (typically 5% of the flue gas stream 202, but may be in the range of 3-10%) is provided to a lower portion of the appendix stripper 360. The appendix stripper may generally be a stripper column, in which the $CO_2$ lean ammonia solution 242 is heated to a temperature at which lower boiling point components may be transferred to the gas phase to form an ammonia rich gas stream 344, while higher boiling point components remain in the liquid phase, namely, ammonia lean or free water stream 346 and may be provided to the DCC 218. Within the appendix stripper 360, the $CO_2$ lean ammonia solution 242 flows downward through a mass transfer device (MTD) 348 in a countercurrent direction of the warm flue gas stream 202. The mass transfer device 348 may include packing, such as structural packing, random packing and/or hydrophilic packing. The MTD functions to increase the contact and the resident time of the flue gas 202 and the $CO_2$ lean ammonia solution 242 to facilitate the release or stripping of ammonia to exit line 350. The ammonia rich offgas 344 is provided to the suction drum 246. The booster fan 318 in fluid communication with the suction drum 246 and $CO_2$ absorber 240 draws both the ammonia rich gas streams 308, 344 and the cooled flue gas stream 316 into the suction drum 246 and to the lower portion of the $CO_2$ absorber 240. Advantageously, the heat of the flue gas stream 202 provided to the appendix stripper 360 eliminates the need for a heat exchanger or reboiler 370 of FIG. 2. The appendix stripper 360 is heated to a temperature in the range of 60-70 degrees Celsius.

A further advantage of the present invention includes the elimination of a dedicated steam extraction source from a power plant steam cycle to operate the stripper for some capture systems results in an improved and less costly approach to the supply of energy to the capture system.

A still further advantage includes the reduction of steam energy also means the same or comparable energy reduction on the cooling. Further, the stream 308 is saturated with CO2 further enhancing ammonia absorption capacity.

While the components of the systems set forth herein are described as having various numbers of inlets and outlets, the present disclosure is not limited in this regard as the components described herein may have any number of suitable inlets and/or outlets, as well as pumps, valves and so forth, without departing from the broader aspects disclosed herein. Similarly, while reference is herein made to various locations, such as top, bottom, and so forth, the present disclosure is not limited to exact locations, as the various lines and streams disclosed herein can enter/exit at other locations. Still further, it will be appreciated that the embodiments shown in FIGS. 2 and 3 could include other components, such as control valves, vapor/liquid separators, pumps, and so forth.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An ammonia absorption system of a carbon capture system for removing carbon dioxide from a flue gas stream, said ammonia absorption system comprising:
   an absorber column configured to receive a carbon dioxide lean gas stream having ammonia and an absorbent, wherein the absorbent absorbs ammonia from the carbon dioxide lean gas stream to provide an ammonia reduced gas stream and an ammonia rich absorbent; and
   an ammonia stripper to receive the ammonia rich absorbent and to receive a portion of the flue gas stream, wherein the flue gas stream flows through the ammonia stripper to heat the ammonia rich absorbent to release the ammonia therefrom and provide an ammonia rich gas stream and an ammonia reduced absorbent; and
   a suction drum in fluid communication with the ammonia stripper and a carbon dioxide absorber to draw the ammonia rich gas stream to the carbon dioxide absorber.

2. The ammonia absorption system of claim 1, wherein the flue gas has a temperature in the range of 60 to 70 degrees Celsius.

3. The ammonia absorption system of claim 1, wherein the ammonia stripper includes a mass transfer device therein to aid the stripping of ammonia from ammonia rich absorbent.

4. The ammonia absorption system of claim 1, wherein the flue gas stream provided to the ammonia stripper is approximately 5 to 20% of the flue gas stream provided to the carbon capture system.

5. The ammonia absorption system of claim 1, further including a heat exchanger for heating the ammonia rich absorbent to a temperature in the range of 60-80 degrees Celsius.

6. The ammonia absorption system of claim 1, wherein the flue gas stream provided to the ammonia stripper is lean in sulfur oxides (SOx).

7. The ammonia absorption system of claim 1, wherein the flue gas stream is flue gas from a furnace.

8. The ammonia absorption system of claim 1, further comprising an appendix stripper to receive a second ammonia rich absorbent stream and to receive a second portion of the flue gas stream, wherein the second portion of the flue gas stream flows through the appendix stripper to heat the second ammonia rich absorbent to release the ammonia therefrom and provide an ammonia rich gas stream to a carbon dioxide absorber and provide an ammonia reduced liquid to a cooling system for the flue gas stream.

9. The ammonia absorption system of claim 1, wherein a liquid phase settled in the suction drum is provided to a lower portion of the carbon dioxide absorber.

10. The ammonia absorption system of claim 1, wherein the suction drum receives at least a second ammonia rich gas stream.

11. The ammonia absorption system of claim 1, further comprising a booster fan in fluid communication with the suction drum and the carbon dioxide absorber.

12. The ammonia absorption system of claim 11 wherein the suction drum and booster fan draw both the ammonia rich gas stream and a cooled flue gas stream to the carbon dioxide absorber.

* * * * *